United States Patent [19]

Skeem

[11] 4,266,899
[45] May 12, 1981

[54] ROUND BALE FEEDER

[76] Inventor: Wayne B. Skeem, 1742 Targhee Dr., Twin Falls, Id. 83301

[21] Appl. No.: 34,932

[22] Filed: Apr. 30, 1979

[51] Int. Cl.³ ............... A01F 25/20; B65H 75/42
[52] U.S. Cl. ..................... 414/24.6; 242/86.5 R; 414/608; 414/911
[58] Field of Search ............. 414/24.5, 24.6, 518, 414/911, 607, 608; 242/86.5 R, 86.52; 100/88, 89; 180/53 C, 53 D, 53 FE

[56] References Cited

U.S. PATENT DOCUMENTS

| Re. 17,538 | 12/1929 | Barton | 180/53 FE |
|---|---|---|---|
| 1,107,633 | 8/1914 | Thomas . | |
| 3,321,789 | 5/1967 | Gundelfinger et al. . | |
| 3,779,208 | 12/1973 | Gay | 414/24.6 X |
| 3,861,616 | 1/1975 | Dubberke | 242/86.5 R |
| 3,874,609 | 4/1975 | Larson | 414/24.6 |
| 4,002,147 | 1/1977 | Feterl | 414/24.5 X |
| 4,024,970 | 5/1977 | Schirer | 414/24.6 X |
| 4,025,006 | 5/1977 | Turnbow | 414/24.6 X |
| 4,044,967 | 8/1977 | Guichon | 414/24.6 |
| 4,049,140 | 9/1977 | Roose | 414/24.6 |
| 4,084,707 | 4/1978 | McFarland | 414/24.6 |
| 4,195,958 | 4/1980 | Vahlkamp et al. | 414/911 X |

FOREIGN PATENT DOCUMENTS

| 2271868 | 7/1978 | France | 414/24.6 |
|---|---|---|---|
| 1357939 | 6/1974 | United Kingdom | 242/86.5 R |

Primary Examiner—Leslie J. Paperner
Attorney, Agent, or Firm—Roylance, Abrams, Berdo & Farley

[57] ABSTRACT

An apparatus for feeding a spirally wrapped round bale of fibrous material, such as hay, comprising a flat support, and endless flight conveyor having a top run extending across the top of the support, a retaining wall at one end of the support, a restriction roller having fingers extending therefrom for gripping the fibrous material, and a power mechanism for driving the roller and the conveyor to feed a round bale positioned between the wall and the roller. The power mechanism includes a wheeled vehicle having a forklift receivable by the support for lifting and transporting the support. Mating hubs on the support and the vehicle transmit rotational power from the vehicle to the feeding apparatus.

19 Claims, 7 Drawing Figures

ROUND BALE FEEDER

FIELD OF INVENTION

The present invention relates to an apparatus for feeding a spirally wrapped round bale of fibrous material, such as hay. More particularly the invention relates to a portable bale support bed having an endless conveyor and a restriction roller with fingers thereon for feeding the fibrous material from the support bed. A wheeled vehicle has a forklift assembly which is receivable in the support bed to elevate and transport the support bed and the bale received thereon.

DESCRIPTION OF THE PRIOR ART

In the early 1970's the routine baling of hay in rectangular bales was changed to spirally wrapped round bales. The main reason for this change was to eliminate the costly binding material required to bind rectangular bales. However, with the onset of such round bales, numerous problems ensued. This is so basically because the new round bales typically weigh up to 1500 pounds and their feeding is difficult. Various prior art devices have been utilized to feed such round bales; however, most of these have their own disadvantages.

Thus, one prior art device incorporates a trailer which has an endless belt conveyor for receiving the round bale and for unwrapping the bale. The bale is maintained on top of the conveyor by means of two retaining walls. However, the large weight of the bale tends to make the endless belt conveyor sag and the trailer itself is an inconvenient mode in tight quarters, such as a manger. Other devices incorporate two spaced rollers for supporting and unwrapping the bale therebetween; however, these typically unwrap the bale in a direction longitudinal of a wheeled vehicle pulling the apparatus, which reduces the control of the feeding operation and does not deliver to one side for manger feeding. Many other prior art devices include mechanisms for merely unwrapping the round bale by rolling it upon the ground. Once again there is very little control in this operation. Finally, many of the prior art devices include mechanisms for gripping the bale along its central axis and lifting the bale upwards so that it may be unwrapped. These methods do not control the amount delivered over a given distance nor do they deliver to the manger along one side of the vehicle. This also requires very large and strong equipment which is expensive. Moreover, in many of these prior art devices a number of steps are required by the operator, including numerous mountings and dismountings of a wheeled vehicle used in conjunction with the prior art devices. Some even require a second vehicle for loading the feeding apparatus.

SUMMARY OF THE INVENTION

Accordingly, it is a primary object of the present invention to provide a new and improved round bale feeder which is uncomplicated to manufacture and simple to operate in conjunction with a conventional forklift assembly.

Another object of the present invention is to provide a round bale feeder which does not require large outputs of power and which provides a high degree of feeding control.

Another object of the present invention is to provide a round bale feeder in which the feeding operation can be accomplished with a minimum amount of operator dismount from an associated wheeled vehicle.

Another object of the present invention is to provide a round bale feeder which can easily feed, via side-delivery, uneven or spongy bales in both the restricted area of a manger and the open field by the combination of an endless conveyor and a fingered roller.

The foregoing objects are basically attained by providing an apparatus for feeding a spirally wrapped round bale of fibrous material, the combination comprising a substantially flat support having first and second ends and a retaining wall adjacent said second end; an endless conveyor, coupled to the support, having top and bottom runs, the top run extending across the top of the support and moving from the second end to the first end; a restriction roller, rotatably mounted on the support between the first and second ends, the roller having gripping means extending therefrom for gripping the fibrous material and pulling it towards the first end; and means on said support for rotating the roller and driving the conveyor, whereby a round bale of fibrous material is positionable between the roller and the retaining wall with the bottom supported on the conveyor top run and with an outer end of the spirally wrapped material engaged by the gripping means so that the fibrous material is unwrapped and fed off the support at the first end when the means for rotating is driven.

In addition, the apparatus further includes a wheeled vehicle, such as a tractor, having a forklift assembly thereon, the assembly comprising a plurality of tines, the support including a plurality of tine receiving assemblies fixedly mounted thereon, whereby upon upward movement of the tines received in the tine receiving assemblies elevates the support for transport by the wheeled vehicle.

Preferably, a slotted hub located on the support receives an extension on a corresponding hub located on the wheeled vehicle so that the rotary power for the feeding apparatus is easily transferred from the wheeled vehicle to the support.

By so providing such an apparatus, the round bale of fibrous material, such as hay, can easily be fed with a high degree of control. This includes feeding of the material either in a manger, where space is limited, or in the open field. High power requirements are not necessary and both uneven and spongy bales may easily be fed from the apparatus.

Preferably, the forklift assembly tines on the wheeled vehicle are first used to place the round bale on the support and then these tines are manipulated into a receiving position on the support. Thus, elevation of the forklift will also elevate the support so that it may be transported to any desired location. Moreover, with the engageable hubs, power can be delivered to the feeding mechanism without the operator dismounting from the tractor.

Other objects, advantages and salient features of the present invention will become apparent from the following detailed description, which, taken in conjunction with the annexed drawings, discloses a preferred embodiment of the present invention.

DESCRIPTION OF THE DRAWINGS

Referring now to the drawings which form a part of this original disclosure.

DETAILED DESCRIPTION OF THE INVENTION

Figure 1:
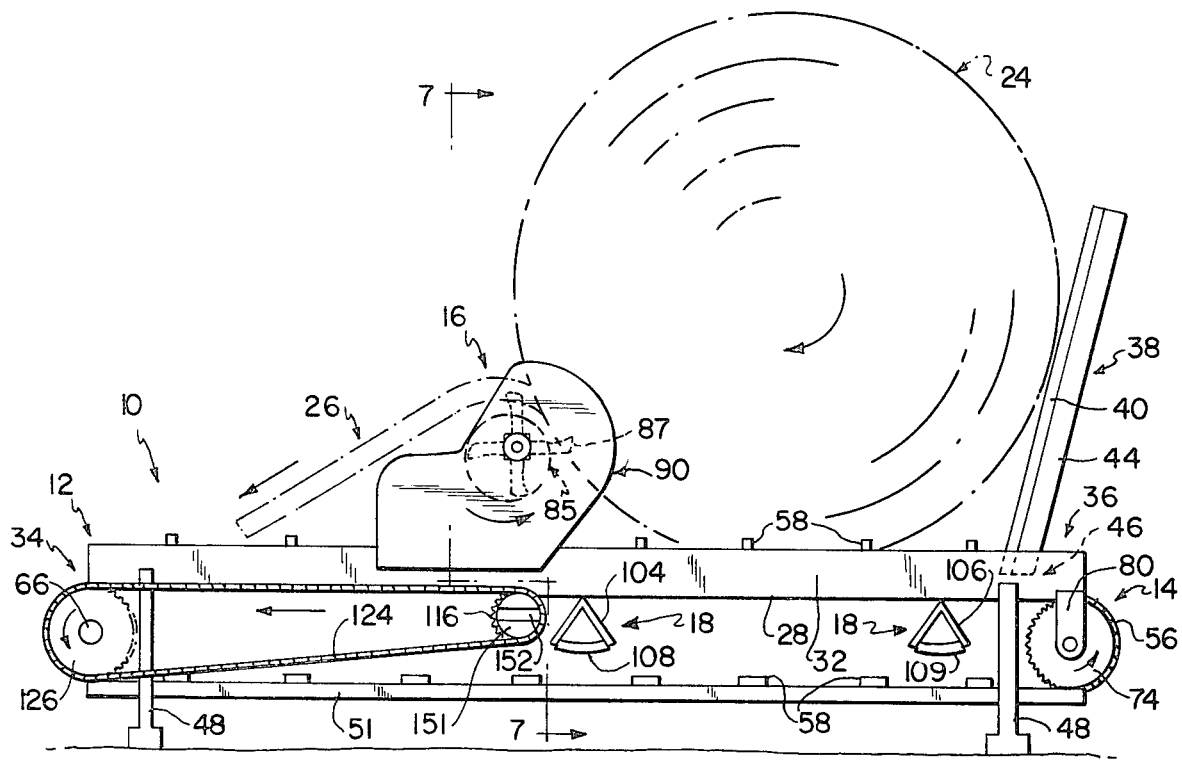
FIG. 1 is a front elevational view of a feeding apparatus in accordance with the present invention with a round bale shown in phantom being located on the feeding apparatus support, which is in turn supported on the ground.
Figure 2:
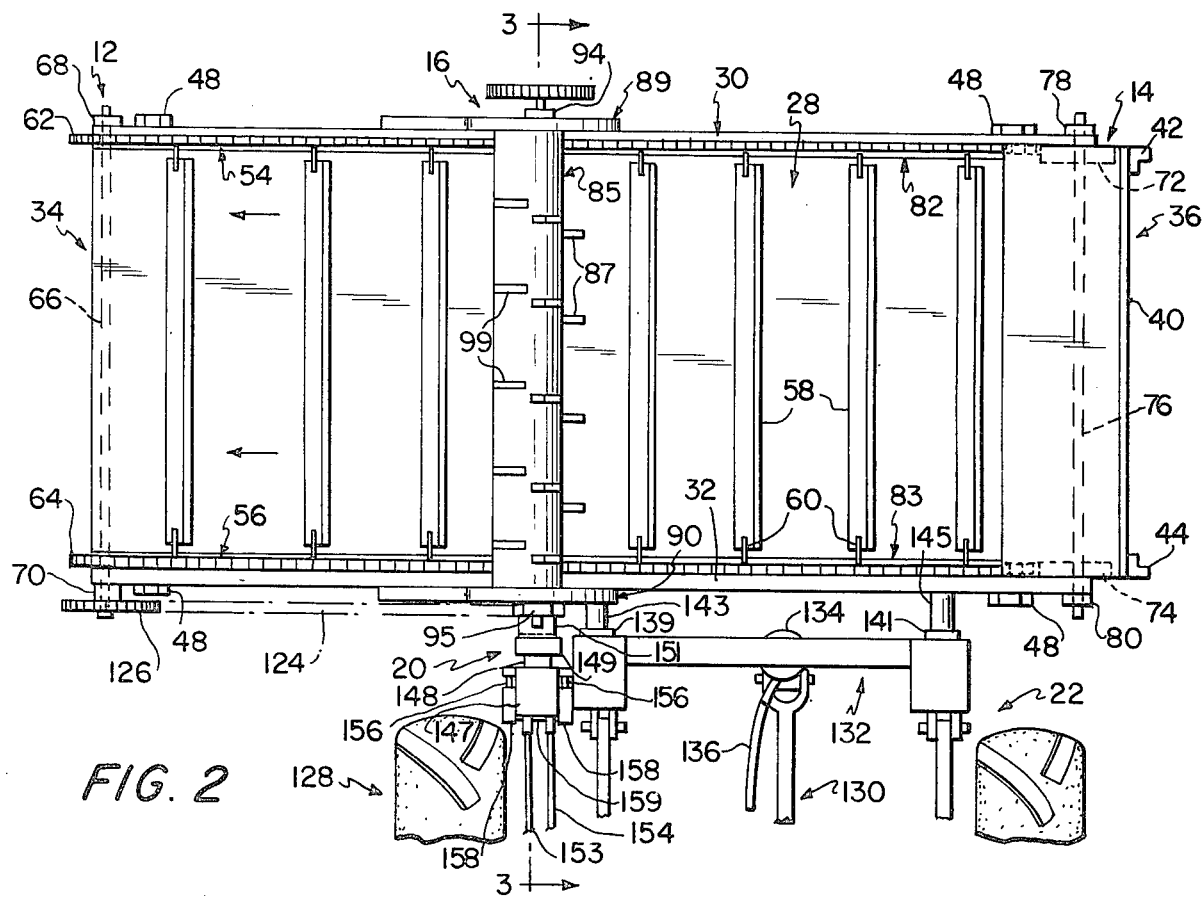
FIG. 2 is a top plan view of the apparatus shown in FIG. 1, except the bale is not depicted and the pertinent parts of a tractor having a forklift assembly thereon is shown in engaging relationship with the feeding apparatus support and with the two corresponding hubs in engagement.
Figure 3:
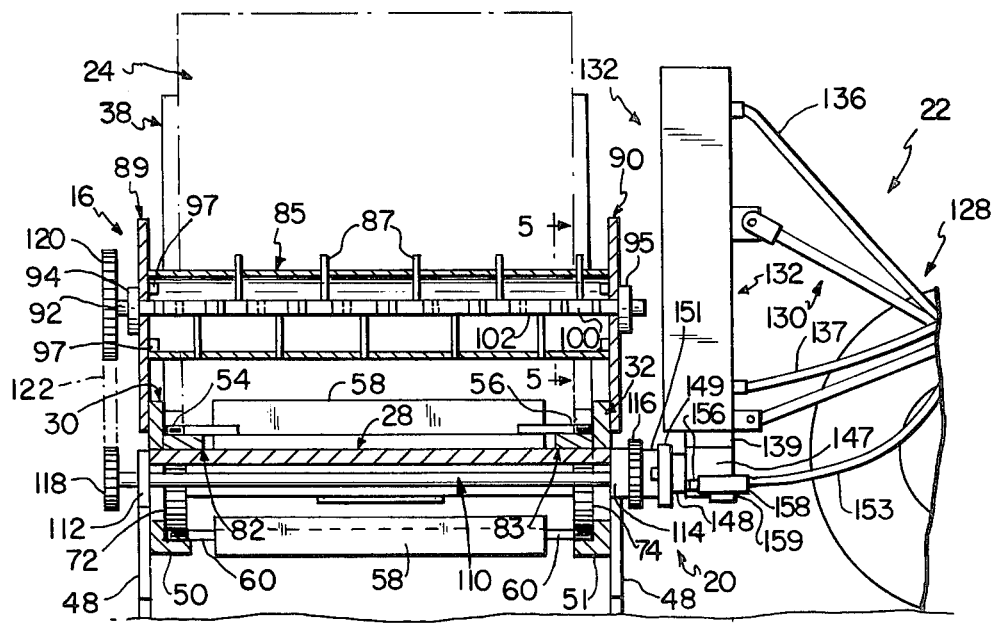
FIG. 3 is a left side elevational view in section taken along lines 3—3 in FIG. 2 showing both the top and bottom runs of the endless flight conveyor and the interior of the restriction roller.

As seen in FIGS. 1, 2 and 3, the feeding apparatus 10 of the present invention comprises a support 12, an endless conveyor 14, a restriction roller assembly 16, a tine receiving assembly 18, a power mechanism 20 and a lifting and transporting assembly 22.

The spirally wrapped round bale of fibrous material, such as hay, is shown in phantom lines in FIG. 1 and is designated 24 with a trailing outside end 26.

The support 12 comprises a horizontally oriented flat support plate or bed 28 having upright, opposed side plates 30 and 32 rigidly secured on opposed sides of support plate 28. This support plate 28 has a first end 34, which is on the left as viewed in FIG. 2 and which is the material delivery end, and a second end 36, which is on the right as viewed in FIG. 2. Adjacent the second end 36 is a retaining wall 38 extending upwardly from the side plates 30 and 32 and formed from a base plate 40 and two angle irons 42 and 44 coupled on opposed sides of the base plate and secured to the side plates. As best seen in FIG. 1, the bottom of the retaining wall 38 is spaced above the top surface of the support plate 28 thereby defining a slot 46 through which the top run of the endless conveyor 14 can move, as discussed in more detail hereinafter. The retaining wall 38 is not perpendicular to the top surface of the support plate 28, but instead is at an angle of about 80°, extending towards the second end 36.

As seen in FIG. 1, the bale 24 is interposed between the retaining wall 38 and the restriction roller assembly 16, with the bottom of the bale resting on the endless conveyor 14 and support plate 28.

Supporting the support 12 above the ground level are four legs 48 which are suitable secured adjacent the four corners of support 12. Although only four are shown, more may be used as desired.

As best seen in FIGS. 1 and 3, two opposed channels 50 and 51 in the form of right-angle irons are rigidly supported by the inside surfaces of the four legs 48 beneath the side plates 30 and 32. These channels 50 and 52 extend from the first end 34 to the second end 36 of the support 12.

The endless conveyor 14 comprises two opposed endless chains 54 and 56 with a plurality of right-angle iron flights 58 coupled at opposite ends to these chains. The flights 58 are essentially perpendicular to the runs of the chains and are each attached at opposed ends by a short rod 60 which is suitable rigidly secured to the flight and to one piece of the chain, such as by welding.

As seen in FIG. 2, at the first end 34 of support 12, the chains 54 and 56 extend about sprocket wheels 62 and 64 which are suitably supported on a shaft 66 which is in turn suitably supported on bearings 68 and 70 rigidly secured to side plates 30 and 32 respectively.

Figure 7:
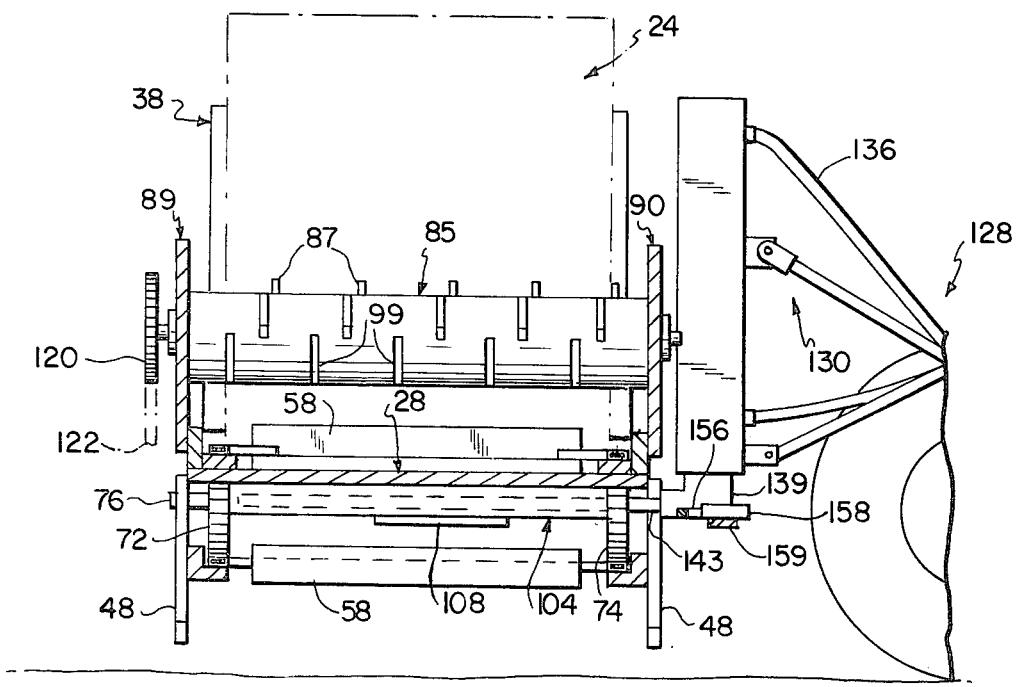
FIG. 7 is a left side elevational view in section taken along lines 7—7 in FIG. 1 showing the tines of the forklift received in the tine receiving assemblies on the feeding support, with the feeding support having been elevated above the ground for transport.

Similarly, as seen in FIGS. 2 and 7, at the second end 36 chains 54 and 56 extend around sprocket wheels 72 and 74 which are supported on shaft 76, which is in turn supported for rotation on bearings 78 and 80 suitably rigidly supported on the ends of side plates 30 and 32.

By so supporting the endless chains 54 and 56, along with flights 58, the endless conveyor 14 has a top run across the top surface of support plate 28 and has a bottom run beneath that plate. As seen in FIG. 3, on the top run the opposed chains 54 and 56 are adjacent the inside surfaces of side plates 30 and 32 and respectively run on wear plates 82 and 83 suitable secured on the top of support plate 28. In addition, along the bottom run the opposed chains 54 and 56 are received in the horizontal leg of channels 50 and 51.

As seen in FIGS. 2 and 3, in the top run of the conveyor 14 the horizontal leg of each flight 58 rests on the top surface of support plate 28 and faces towards the first end 34.

As seen in FIGS. 1-3, the restriction roller assembly 16 comprises a cylindrical restriction roller 85 having a plurality of fingers 87 extending therefrom and two opposed support walls 89 and 90 rigidly secured on the outside surfaces of side plates 30 and 32. The roller 85 is positioned substantially midway between the retaining wall 38 adjacent the second end 36 of support 12 and the first end 34 where ultimate delivery of the fibrous material is made from the support 12.

Figure 4:
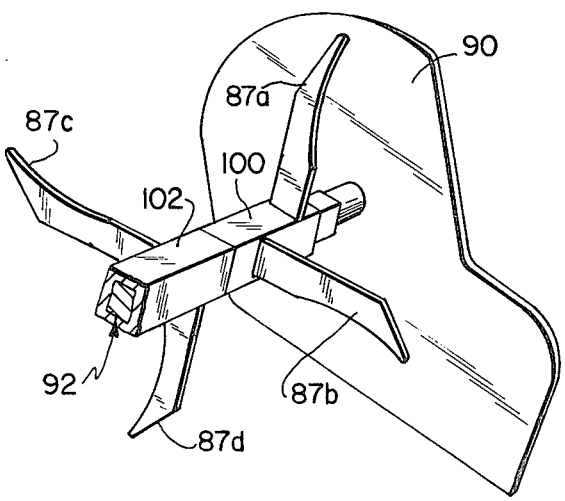
FIG. 4 is an enlarged right perspective view of the gripping fingers located within the restriction roller, the roller not being shown for reasons of clarity.

As seen in FIGS. 3 and 4, the fingers 87 are supported on a square shaft 92 having circular ends which are received through suitable apertures in walls 89 and 90 and are supported in bearings 94 and 95 respectively mounted on the outside surfaces of support walls 89 and 90.

As seen in FIGS. 1, 2, 3, 5 and 6, the square shaft 92 with the associated fingers 87 supported thereon is eccentric to the axis of rotation of restriction roller 85, this roller being mounted by means of suitable bearings 97 secured on the inside surfaces of opposed support walls 89 and 90. For each finger 87 there is an associated aperture in the form of a slot 99 through which it extends in the restriction roller 85. Since the shaft 92 supporting the fingers 87 is eccentric to the central axis of rotation of the roller 85, the fingers 87 only extend through the slots 99 and past the outer surface of roller 85 during the approximate 180° of rotation to the rear of a vertical plane passing through the shaft 92. This is seen in FIGS. 1, 2 and 3.

Figure 5:
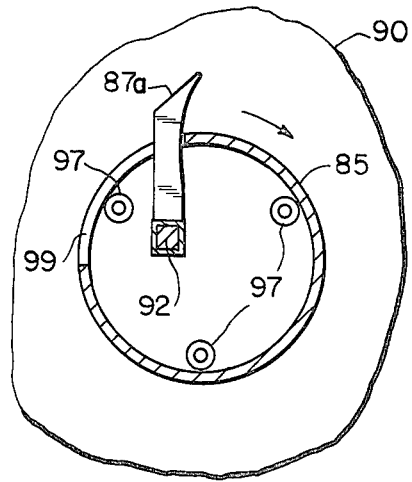
FIG. 5 is an enlarged rear elevational view taken in section along lines 5—5 in FIG. 3 showing the interior of the restriction roller and the gripping finger closest to the front of the feeding apparatus.

In addition, it is shaft 92 which is driven so that roller 85 is rotated by means of contact thereof with each finger 87 at the forward most portion of each slot 99. This is seen in FIGS. 5 and 6 in which the finger 87 has moved through 90° of travel from the position in FIG.

Figure 6:
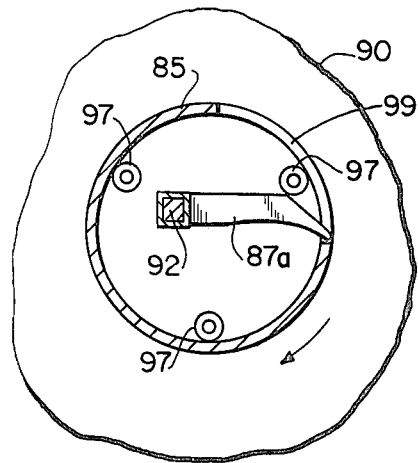
FIG. 6 is a view similar to that shown in FIG. 5; however, the gripping finger shown in FIG. 5 has rotated 90°, thereby rotating the roller the same 90°.

5 into the position shown in FIG. 6 and has pushed the roller 85 therealong. It is also seen in FIGS. 5 and 6 that the finger 87 does not extend past the outer surface of roller 85 in the front 180° of arc of roller 85.

As seen in FIG. 4, each set of four fingers 87 is divided into two sets of two, each set being rigidly secured on a different face of a square tube which is received on square shaft 92. Thus, as seen in FIG. 4 a first finger 87a and a second finger 87b are rigidly secured to a square tube 100 and the next set 87c and 87d are secured to a second square tube 102. These square tubes 100 and 102 are duplicated from one support wall 90 to the other support wall 89 as seen in FIG. 3 so that the fingers 87 extend completely across from one side to the other of support plate 28. As seen in FIG. 4, finger 87a is substantially vertical, finger 87b is rotated 90° in a substantially clockwise fashion from finger 87a, finger 87d is rotated substantially 90° clockwise from finger 87b and finally finger 87c is rotated substantially 90° clockwise from finger 87d. Each of these fingers is transversely separated from each other along the transverse width of roller 85. Similarly, each of the slots 99 receiving the associated finger is spaced from the adjacent slot and aligned with that finger. In order to assemble the roller 85 with its associated fingers 87 therein, the fingers and their associated square tubes are first placed inside the roller with the proper orientation and with the fingers extending through the proper slots. Then the square shaft 92 is threaded through each of the square tubes and into the respective bearings 94 and 95 at opposite ends.

As seen in FIGS. 1 and 7, the tine receiving assembly 18 is formed from two inverted right angle irons 104 and 106 which are suitably secured to the bottom of the support plate 28, such as by welding. The angle iron 104 is substantially below the rear of support walls 89 and 90 and the other angle iron 106 is adjacent the bottom of retaining wall 38. Each of these angle irons extends substantially fully across the bottom of support plate 28, as seen in FIG. 7, and each has across a portion of its length in the center thereof a curved retaining plate 108 and 109 welded to the outermost portions of the legs forming each angle iron. As will be described in more detail hereinafter each of these angle irons receives a rod shaped tine from the forklift assembly and since each is in an inverted right triangular shape these tines are self-centering in the angle irons. Moreover, the retaining plates 108 and 109, once the tines are received therein, prevents the inadvertent release of the tines from the tine receiving assembly 18.

As best seen in FIGS. 1-3, the power mechanism 20 for the feeding apparatus 10 comprises a plurality of sprocket wheels and chains. Specifically, as seen in FIG. 3, a shaft 110 extends across the bottom of support 28 below the restriction roller assembly 16 and is supported by bearings 112 and 114 suitably secured to opposed outside edges of support plate 28. This shaft 110 has a first sprocket wheel 116 rigidly supported thereon below support wall 90 and has a second sprocket wheel 118 supported rigidly at the other end thereof below support wall 89. On that side of the apparatus, the square shaft 92 for fingers 87 has secured thereto a third sprocket wheel 120, sprocket wheels 120 and 118 being vertically aligned and interconnected via chain 122. Thus, rotation of the first sprocket wheel 116 results in rotation of shaft 110, rotation of the second sprocket wheel 118, rotation via chain 122 of the third sprocket wheel 120 and ultimately the rotation of the square shaft 92. This rotation of shaft 92 results in a rotation of fingers 87 and roller 85.

As seen in FIGS. 1 and 2, the first sprocket wheel 116 is also coupled via chain 124 to the fourth sprocket wheel 126 rigidly supported on the shaft 66 located at the first end 34 of the support plate 28. Thus, rotation of the first sprocket wheel 116 results in rotation via chain 124 of the fourth sprocket wheel 126 and the subsequent rotation of shaft 66. Rotation of this shaft results in rotation of sprocket wheels 62 and 64 having the endless chains 54 and 56 thereon, causing movement from the second end to the first end of the top run of the flights 58 on the endless conveyor.

A wheeled vehicle, such as a conventional tractor 128, partly shown in FIGS. 2, 3 and 7, is utilized to provide a lifting and transporting assembly 22 for the apparatus 10. The tractor 128 includes a conventional three-point hitch 130 which supports a conventional forklift assembly 132. This forklift assembly 132 is suitable hydraulically powered and includes a vertical hydraulic cylinder 134, seen in FIG. 2, supplied by tubes 136 and 137 with hydraulic fluid, these tubes being suitable attached to a hydraulic fluid reservoir and a suitable controllable hydraulic pump. Two support rods 139 and 141 are coupled conventionally to the piston moving through hydraulic cylinder 134 so that these rods 139 and 141 can be raised and lowered as desired in the forklift assembly 132. Horizontally extending from each of these support rods are two cylindrical rods or forklift tines 143 and 145 as seen in FIGS. 2 and 7. As is evident, from FIGS. 1, 2 and 7, each of these tines 143 and 145 is respectively releasably receivable in each of the angle irons 104 and 106 in the tine receiving assembly 18.

As seen in FIGS. 2 and 3, the power mechanism for the apparatus 10 also comprises an external rotary drive in the form of a hydraulic motor 147 secured to the bottom of vertical support rod 139 on the forklift assembly 132. Thus, vertical movement of rods 139 and 141 result in vertical movement of the hydraulic motor. Coupled to the output shaft 148 of hydraulic motor 147 is a hub 149 which has a central extension in the form of an extending plate 150 thereon for the engagement in a corresponding hub 151 rigidly secured to the first sprocket wheel 116 on the apparatus 10. This hub 151 has an indentation or slot 152, as seen in FIGS. 1 and 3, for the reception of the extending plate on the hub 149. Thus, rotation of the hydraulic motor 147 via a suitable hydraulic pump and hydraulic tubes 153 and 154 results in rotation of the hub 149 and the corresponding engaged hub 151. This provides rotation to the first sprocket wheel 116. Preferably, the hydraulic motor 147 and its hub 149 are resiliently mounted along the direction of shaft 148 so that the hubs may easily be joined upon placement of the hub 149 adjacent hub 151. This can be accomplished, as seen in FIGS. 2 and 7, by fixedly mounting two rods 156 on opposite sides of the motor 147 and slightly spaced from the motor itself by short rods or a plate, which rods are slidably received in two tubes 158 coupled to vertical support rod 139, with a coiled spring being located inside each tube and compressed between the end of each rod and a closed end of each tube. One of the tubes 158 is coupled to the rod 139 and has a plate 159 extending therefrom below and to the other side of the motor 147 for supporting at its end the other of tubes 158.

OPERATION

In order to utilize the apparatus of the present invention, the apparatus 10 is placed in approximately the area in which the bale 24 is to be fed. This is easily accomplished by maneuvering tractor 128 so that tines 143 and 145 are received in angle irons 104 and 106 and then the forklift assembly 132 is activated so as to raise these tines upwardly, thereby raising the apparatus 10. The tractor 128 can then be maneuvered to any desired position with the attached apparatus 10. Then, the operator of the tractor proceeds to where the bales 24 are kept and picks up a single bale by lifting it by means of the tines 143 and 145 on the forklift assembly. This bale is then brought to the location of the feeding apparatus 10 and is placed on the support surface 28 between the retaining wall 38 and the restriction roller assembly 16. The tines 143 and 145 are then withdrawn from beneath the bale 24, the forklift is lowered, and the tines are then received in angle irons 104 and 106. With movement of the tines into a deep reception in the angle irons, the extension on hub 149 is received in the slot in hub 151. Thus, upon actuation of the hydraulic motor 147 the corresponding engaged hubs will rotate, thereby actuating and driving both the endless conveyor 14, so that its top run moves from the second end 36 to the first end 34, and the restriction roller 85, as seen in FIG. 1, so that it rotates in the counterclockwise direction. With the trailing end 26 of the bale 24 received on roller 85, rotation of the roller and movement of the conveyor cause the bale 24 as seen in FIG. 1 to begin rotating in the clockwise direction. This continues as the trailing end 26 is moved towards the first delivery end 34 of support 12 and off thereof onto the ground. In order to dispense the material forming bale 24, the forklift assembly 132 is again activated so as to raise the apparatus 10 and the loaded apparatus can be maneuvered as desired.

Regarding this feeding operation, it is very important to note that the rotating roller 85 has a plurality of gripping fingers 87 which dig into the bale 24; grip, loosen, fluff and stretch the fibrous material forming the bale as these fingers rotate; and provide a positive movement to the bale to aid in its clockwise rotation and feeding off the support. Similarly, the endless conveyor formed of the plurality of flights 58 also aids in the clockwise rotation, and therefore unwrapping of the bale 24, and feeds the material to the first end 34 where it cascades from the support and separates into discrete parts.

Once a complete bale is unwrapped, the feeding apparatus 10 is lowered to the ground by lowering the forklift assembly 132 and the tines 143 and 145 are withdrawn therefrom. Then the operator of the tractor proceeds to the bale storage area and picks up another bale for return to the feeding apparatus.

Thus, a plurality of bales can be quickly unwrapped by means of the feeding apparatus and the operator of the tractor need not dismount numerous times to proceed with the operation. Thus, if the feeding operation is to be done far out in the field, the feeding apparatus can be left there while the tractor ferries between the bale storage area and the feeding apparatus located in the field. In addition, if the feeding apparatus is to be used in a manger, it can be carried to the precise areas requiring material from the bale and supported in the elevated position shown in FIG. 7 while the apparatus is operated.

Preferably, the rotational speed of the roller 85 is slightly faster than the rotational speed of the endless conveyor, the speed of about 60–85 rpm for the roller 85 being preferred.

In an actual apparatus which has been built and which has successfully operated, the first and second sprocket wheels 116 and 118 are 4 inches in diameter and have fourteen teeth, the third sprocket wheel 120 has an 8 inch diameter and forty teeth, and the four sprocket wheels for the endless conveyor each have a diameter of 6 inches and seven teeth. The diameter of the fourth sprocket wheel 126 is 8 inches and it has forty teeth. The support plate 28 is about 5 feet wide and about 8 feet long with the roller 85 having about an 8 inch diameter, with the square shaft 92 being offset about 1¾ inches from the axis of rotation of the roller.

While one advantageous embodiment has been chosen to illustrate the invention, it will be understood by those skilled in the art that various changes and modifications can be made therein without departing from the scope of the invention as defined in the appended claims. For example, as shown in the drawings and described above, the forklift assembly 132 is of the high-reach variety with the tines being movable relative to the forklift assembly frame, which is capable of lifting the support 12 to a height of six or more feet for feeding purposes. However, this type of forklift assembly does not have to be used when the support is required to be lifted only one to three feet. In this situation, the elevation capability of the conventional three-point hitch may be utilized, with the horizontally oriented tines being rigidly secured to a vertical frame which is in turn coupled for elevation to the three-point hitch.

What is claimed is:

1. An apparatus for feeding a spirally wrapped round bale of fibrous material, the combination comprising:
   a substantially flat support having first and second ends and a retaining wall adjacent said second end;
   an endless conveyor, coupled to said support, having top and bottom runs, said top run extending across the top of said support and moving from said second end to said first end;
   a restriction roller, rotatably mounted on said support between said first and second ends and above said top run, said roller having gripping means extending therefrom for gripping the fibrous material and pulling it over said roller and towards said first end; and
   means on said support for rotating said roller and driving said conveyor,
   whereby a round bale of fibrous material is positionable between said roller and said retaining wall with the bottom supported on said conveyor top run and with an outer end of the spirally wrapped material engaged by said gripping means so that the fibrous material is unwrapped and fed off said support at said first end when said means for rotating is driven.

2. An apparatus according to claim 1, wherein said endless conveyor is formed from a plurality of flights coupled to opposed chains, said flights in said top run being supported by the top surface of said support.

3. An apparatus according to claim 1, wherein said gripping means comprises a plurality of thin, rigid fingers extending from the surface of said restriction roller.

4. An apparatus according to claim 1, wherein said means for rotating comprises a slotted hub rotatably mounted on said support for receiving an extension on a corresponding hub coupled to a rotary drive.

5. An apparatus according to claim 1, wherein
said support comprises means for releasably receiving an assembly for lifting said support above the ground.

6. An apparatus according to claim 1, and further comprising
a wheeled vehicle having a forklift assembly thereon, said assembly comprising a plurality of tines,
said support including a plurality of tine receiving assemblies fixedly mounted thereon,
whereby upward movement of said tines received in said tine receiving assemblies elevates said support for transport by said wheeled vehicle.

7. An apparatus according to claim 6, wherein
said wheeled vehicle includes a motor having a shaft, said shaft having thereon a hub with an extension thereon, and
said means for rotating comprises a slotted hub rotatably mounted on said support for releasably engaging said hub on said wheeled vehicle.

8. An apparatus according to claim 1, wherein
said restriction roller is mounted substantially midway between said first and second ends of said support.

9. An apparatus according to claim 1, wherein
said restriction roller is substantially cylindrical with apertures therein,
said gripping means comprising a plurality of thin, rigid fingers extending through said apertures.

10. An apparatus according to claim 1, wherein
said roller has a plurality of apertures therein receiving said gripping means, and
further comprising means for cyclically reciprocating said gripping means outwards and inwards through said apertures.

11. An apparatus for feeding a spirally wrapped round bale of fibrous material, the combination comprising:
a substantially flat support having first and second ends and a retaining wall adjacent said second end;
an endless conveyor, coupled to said support, having top and bottom runs, said top run extending across the top of said support and moving from said second end to said first end;
a restriction roller, rotatably mounted on said support between said first and second ends, said roller having gripping means extending therefrom for gripping the fibrous material and pulling it towards said first end; and
means on said support for rotating said roller and driving said conveyor,
whereby a round bale of fibrous material is positionable between said roller and said retaining wall with the bottom supported on said conveyor top run and with an outer end of the spirally wrapped material engaged by said gripping means so that the fibrous material is unwrapped and fed off said support at said first end when said means for rotating is driven,
said gripping means comprising a plurality of fingers extending from the surface of said restriction roller,
said fingers being mounted on a shaft coupled to said support,
the axes of rotation of said restriction roller and said fingers being offset eccentrically from one another.

12. An apparatus for feeding a spirally wrapped round bale of fibrous material, the combination comprising:
a substantially flat support receiving the round bale thereon and having first and second ends and a retaining wall adjacent said second end;
means, coupled to said support, for unwrapping the round bale and feeding the fibrous material from a position adjacent said second end towards said first end;
a vehicle having a forklift assembly thereon, said assembly comprising a plurality of tines,
said support including a plurality of tine receiving assemblies fixedly mounted thereon, whereby upward movement of said tines received in said tine receiving assemblies elevates said support for transport by said vehicle; and
power means, a part of which is carried by said vehicle, for actuating said means for unwrapping and feeding,
said power means comprising a motor mounted on said forklift assembly, said motor including a shaft with a hub thereon, said hub having an extension; and a slotted hub rotatably mounted on said support for releasably engaging said hub on said vehicle.

13. An apparatus according to claim 12, wherein
said means for unwrapping and feeding comprises an endless conveyor.

14. An apparatus according to claim 12, wherein
said means for unwrapping and feeding comprises rotatable gripping means, located above the top surface of said support and spaced from said retaining wall, for gripping the round bale.

15. An apparatus according to claim 12, wherein
said tine receiving assemblies extend generally perpendicular to the direction of the feeding of the round bale.

16. An apparatus for feeding a spirally wrapped round bale of fibrous material, the combination comprising:
a substantially flat support receiving the round bale thereon and having first and second ends and a retaining wall adjacent said second end;
means, coupled to said support, for unwrapping the round bale and feeding the fibrous material from a position adjacent said second end towards said first end;
a vehicle having a forklift assembly thereon, said assembly comprising a plurality of tines,
said support including a plurality of tine receiving assemblies fixedly mounted thereon, whereby upward movement of said tines received in said tine receiving assemblies elevates said support for transport by said vehicle; and
power means, a part of which is carried by said vehicle, for actuating said means for unwrapping and feeding,
said power means comprising a motor mounted on said vehicle, said motor including a shaft with a hub thereon, said hub having an extension; and a slotted hub rotatably mounted on said support for releasably engaging said hub on said vehicle,
said power means including means for resiliently mounting said motor on said vehicle for movement longitudinally of said motor shaft.

17. an apparatus for feeding a spirally wrapped round bale of fibrous material, the combination comprising:
- a substantially flat support receiving the round bale thereon and having first and second ends, and a retaining wall adjacent said second end;
- means, coupled to said support, for unwrapping the round bale and feeding the fibrous material from a position adjacent said second end towards said first end;
- a plurality of forklift tine receiving assemblies fixedly mounted on said support; and
- rotatable means, carried by said support, for actuating said means for unwrapping and feeding upon connection thereof with an external rotary drive,
- the axis of rotation of said rotatable means and the longitudinal axes of said forklift tine receiving assemblies being parallel;
- said means for unwrapping and feeding comprising
    - an endless conveyor, coupled to said support, having top and bottom runs, said top run extending across the top of said support and moving from said second end to said first end, and
    - a restriction roller, rotatably mounted on said support between said first and second ends and above said top run, said roller having gripping means extending therefrom for gripping the fibrous material and pulling it over said roller and towards said first end.

18. An apparatus according to claim 17, wherein said tine receiving assemblies extend generally perpendicular to the direction of the feeding of the round bale.

19. An apparatus according to claim 17, and further comprising
- a wheeled vehicle having a forklift assembly thereon, said assembly comprising a plurality of vertically movable tines receivable in said forklift tine receiving assemblies, and
- a rotary drive, coupled to said forklift assembly for vertical movement with said tines, for connection with said rotatable means carried by said support.

* * * * *